Sept. 15, 1936. A. E. HILL 2,054,378
RAIL JOINT TESTING INSTRUMENT
Filed July 3, 1934 2 Sheets-Sheet 2
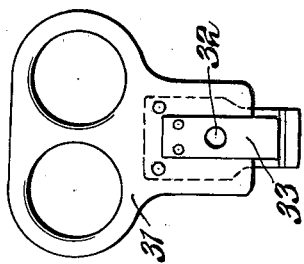
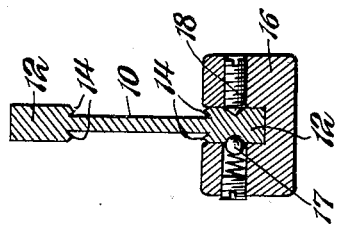
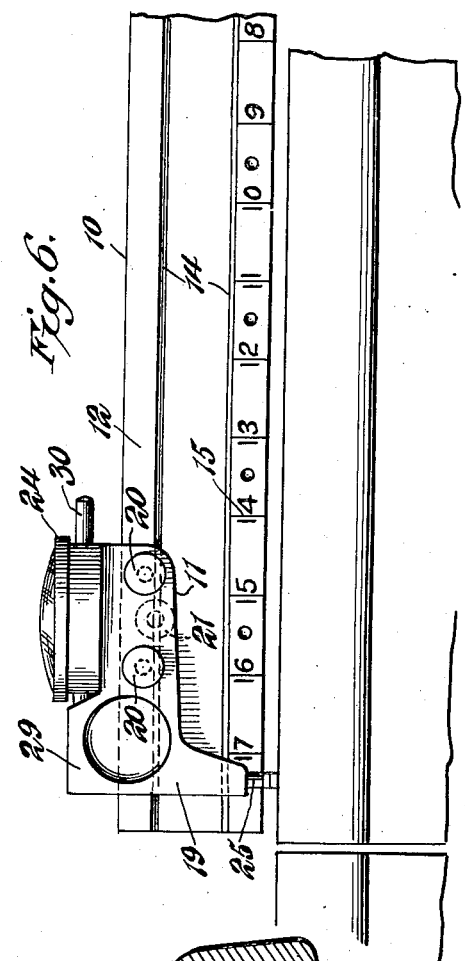
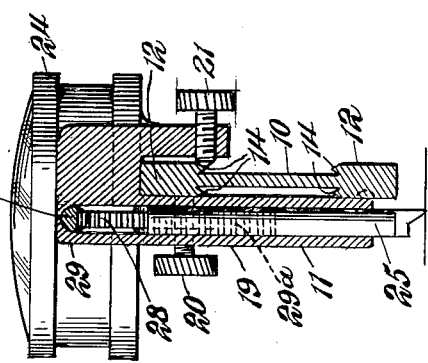
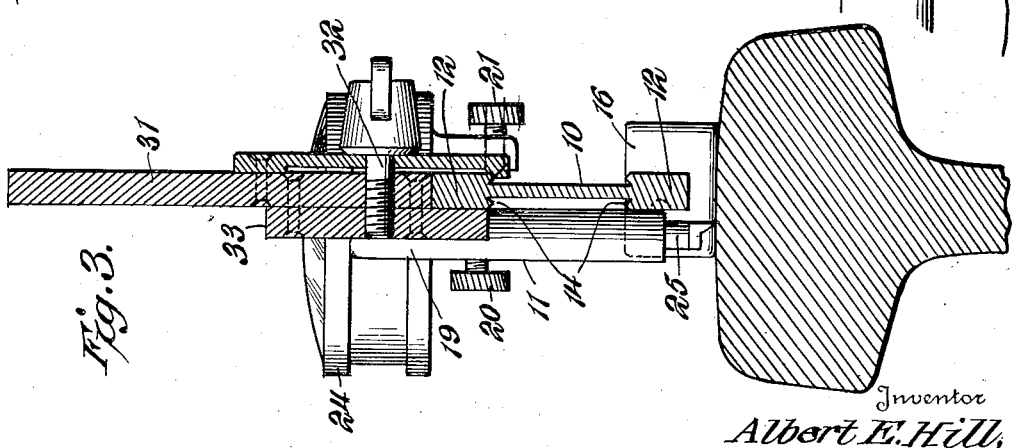
Inventor
Albert E. Hill,
By William B. Deane
his Attorney Patented Sept. 15, 1936

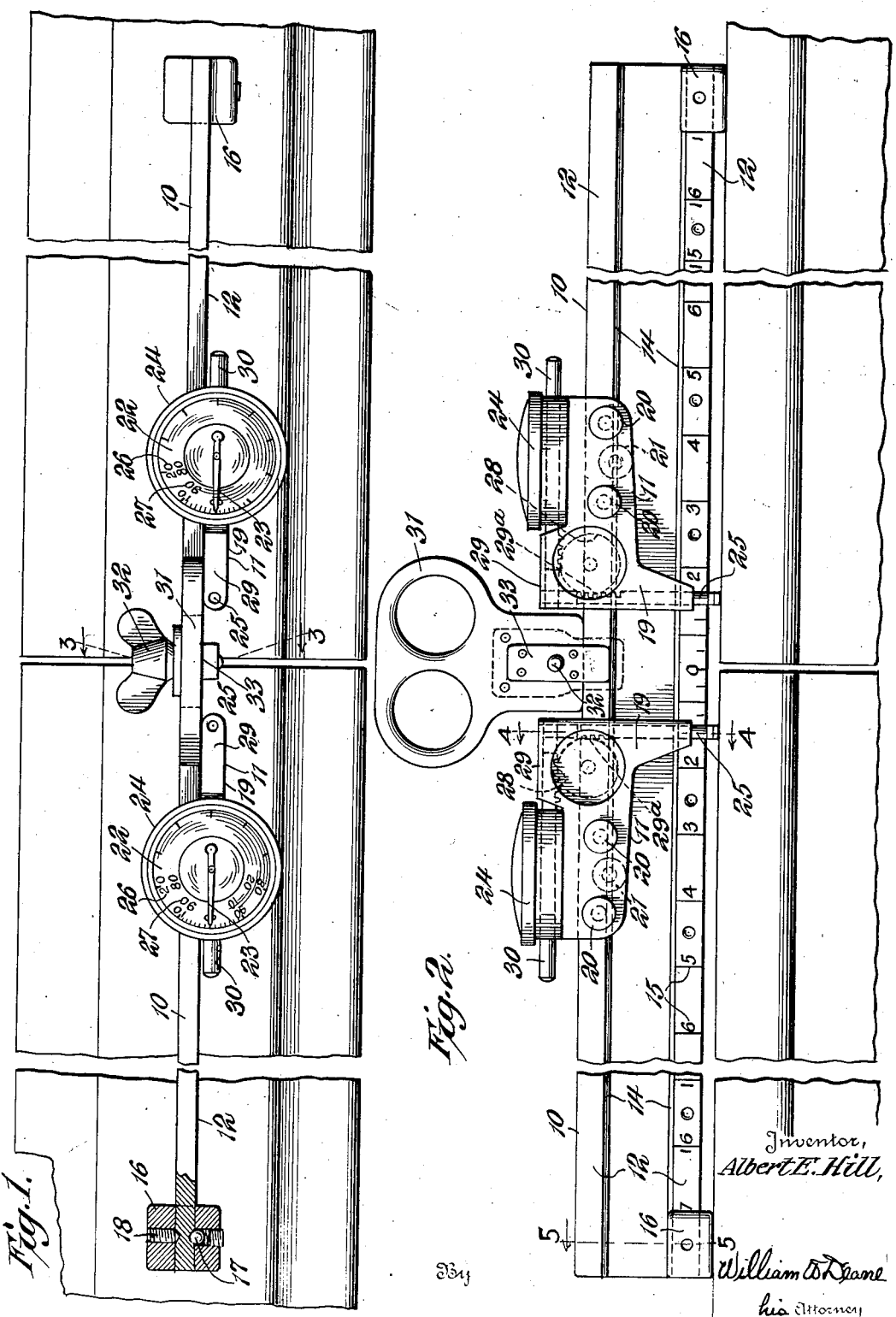

2,054,378

UNITED STATES PATENT OFFICE 2,054,378

RAIL JOINT TESTING INSTRUMENT

Albert E. Hill, New York, N. Y.

Application July 3, 1934, Serial No. 733,651

4 Claims. (Cl. 33—172)

The object of the invention is to provide an instrument which on application to the head of a rail will indicate joint depression or elevation in micrometer measurements; to provide an instrument which, when applied to a rail joint will simultaneously indicate the change made on both sides of the joint when correcting it for elevation or depression, so that both rail ends may be adjusted at the same time and without one adjustment affecting the other; to provide an instrument of the kind described which is adapted to indicate to a nicety the rail end batter; to provide a rail testing instrument which is serviceable for use in measuring rail end bends and for measuring the wear on top of angle bars as well as the degree to which angle bars may be bent on the bottom; and to provide an instrument of the kind indicated which is of comparatively simple form, susceptible of cheap manufacture and of a character that may maintain its efficiency despite hard usage.

With this object in view, the invention consists in a construction and combination of parts of which a preferred embodiment is illustrated in the accompanying drawings, wherein:

Figure 1 is a top plan view of the invention.

Figure 2 is a side elevational view.

Figure 3 is a sectional view on the plane indicated by the line 3—3 of Figure 1.

Figures 4 and 5 are sectional views on the planes indicated by the lines 4—4 and 5—5, respectively of Figure 2.

Figure 6 is an elevational view showing the instrument about to be placed in position to indicate rail end batter.

Figure 7 is a detached view of the finger grip or handle.

The instrument comprises a rail 10 and the indicating heads 11, which are mounted upon the rail for adjustment along the latter or for sliding movement along the same when taking a series of continuous readings, under conditions where such are necessary.

The beam or rail 10 is of web form, the thickened edges 12 being undercut where they adjoin the web and being beveled on their outer edges adjacent the web, so as to provide cross sectionally V-shaped ribs, 14, the function of which hereinafter appears, although it might be here stated that the inner edges of the ribs function as a means for holding a sheet of polar coordinate paper when the readings are graphically recorded as is the case in some uses of the instrument.

At least one of the edges of the beam is graduated, as indicated at 15, the graduations running consecutively from the center to the opposite ends. This, so indicator readings may be taken at fixed points, as hereinafter described.

In the use of the instrument, the beam does not contact with the rails under test but is supported on bearing blocks 16, which are slotted to receive either of the thickened edge portions of the beam, the depth of the slots being such that the engaged edge of the beam will be spaced substantially a quarter of an inch from the rail.

The thickened edge portions of the beam are formed with uniformly spaced seats on opposite faces, while those on one face are adapted for the reception of the spring pressed ball 17 to frictionally hold the block to any of its adjusted positions, the companion seats receive the conical end of a blind set screw 18, which fixedly retain the block in its adjusted position.

Normally the two bearing blocks are mounted on the remote ends of the beam so, in case of a rail joint under test, the beam may be supported on the rails remote from their abutting ends, the beam being disposed with its zero mark at the rail juncture.

The indicating heads 11 comprise each a frame 19 slotted to receive one of the thickened edges of the beam, along which the indicating head may be slid in some uses of the instrument but to which it may be clamped in other uses. The clamping means comprise knurled set screws 20 and 21, the two former being flat ended and threaded through the frame to bear upon the beam at one side, and the latter being conical ended and threaded through the frame to bear upon the beam on the other side, but with the conical end engaging the outer bevel side of the adjacent rib 14, so that in the clamping operation the top wall of the slot is brought down into firm engagement with the upper edge of the beam.

The indicating instrument comprises a dial 22 and the indicator 23 movable over the dial, these being enclosed in an appropriate case 24, the dial being graduated to read in thousandths of an inch for each such movement of the plunger bar 25. The graduation indicia 26 and 27 are arranged in two circular series, the one ascending one one side of the zero mark, and the other ascending on the other side. Preferably the two indicia are distinctively colored so that it may be readily apparent which is the negative and which is the positive reading. The plunger 25 is slidably mounted in the frame 19 and is in the form of a rack 29a meshing with a gear 28 with which a rack 30 is also in mesh, the rack being slidably mounted in a guide in the frame and being at right angles to the plunger bar 25. The rack 30 is operatively connected with the indicator 23 by a suitable gear reduction (not shown because the indicator per se is no part of the invention) so that the movement of a thousandth of an inch of the plunger will be reflected in the movement of the indicator a distance equal to the spacing of the graduations.

The casing 24 is formed with an extension 29 to receive the rack 30 in one of its remote positions.

The plunger 25 is normally extended from the frame by a spring action applied direct to the plunger or by a torsion spring on the indicator, but when it is in a position where its end is exactly one quarter of an inch below the bottom edge of the beam, the indicator will stand over the zero mark on the dial. If the extension of the plunger is more than this amount the indicator will read to one side of the zero, or negatively, indicating depression at the point of test. If the plunger extension is less, the indicator will move to the other side of the zero, reading positively, indicating elevation at point of test.

The two indicator heads 11 are identical, but are so positioned as to stand on opposite sides of the joint, so that readings on both sides may be taken simultaneously.

For convenience in carrying the instrument as from rail joint to rail joint, a finger grip 31 is provided which is detachably secured to the beam through the medium of a clamp screw 32 and its associated clamp plate 33.

In the use of the instrument the bearing blocks are secured at the remote ends of the beam, if a joint is to be tested for irregularity. The indicating heads are then secured adjacent the center of the beam, so that their plungers 25 will bear on top of connecting rail heads. Depression or elevation of one or both will then be shown by the indicators, and if the joint be of the improved form for adjustment to correct the irregularities, such adjustment may be proceeded with to effect elevation or depression as the case may require, the one indicator showing the effect of the adjustment on one side and the other on the other side, thus providing for bringing the joint back to normal condition with a minimum of time and effort. Were only one indicator used, test would first have to be made on one side of the joint and then on the other side with repeated shifting of the indicator head for making the necessary tests.

If an angle bar is to be tested for wear on its upper edge or bend on its lower edge, the bearing blocks are adjusted to intermediate positions on the beam, so as to bear at the ends of the angle bar since the beam is normally longer than the angle bar. Indicating heads may then be employed to indicate the sought irregularities in the angle bar and may be positioned at any point along the beam for this purpose or slid along the beam.

When employing the instrument for indicating rail batter, the bearing blocks are removed and the lower edge of the beam seated upon the rail with its end at the end of the rail. One of the indicating heads is then employed but released from its clamping engagement with the beam to be slid along the latter. Beginning at the end of the rail, readings may be taken along the beam at the points of the graduations thereon and thereby a complete showing may be made of the irregularities present. But in this use of the instrument allowance must be made for the two tenths of an inch representing the elevation of the beam above the rail when the foot blocks are used.

The invention having been described, what is new and useful is:

1. Means for testing the meeting ends of railroad rails relative to each other and relative to the normal plane of the rails, comprising a bar having means for supporting it by the rails remote from the meeting ends and in a plane parallel to the normal plane of the rails, said bar overlying the meeting ends of the rails, and duplicate means carried by the bar for respective cooperation with the rails at their meeting ends to simultaneously register any vertical offset relation of the rail ends relative to each other and any vertical offset relation of either rail end relative to the normal plane of the rails.

2. A testing means for the meeting ends of railroad rails relative to each other and relative to the normal plane of the rails, comprising a bar overlying the meeting ends of the rails and having means for supporting it by the rails remote from the meeting ends, said bar lying parallel to the normal plane of the rails, and duplicate independent means carried by the bar to simultaneously indicate the degree of vertical offset of the rail ends relative to each other and the degree and direction of vertical offset of each rail end relative to the normal plane of the rails.

3. A testing means for the meeting ends of railroad rails, including a bar to overlie such ends and having means for supporting it remote from the ends to maintain the bar parallel with the normal plane of the rails, and indicating means carried by the bar, said indicating means comprising duplicate registers, and a rail-engaging element for operating each register, the registers being movable on the bar to position the elements to engage both rail ends or one such end at will.

4. Means for testing the meeting ends of railroad rails relative to each other and relative to the normal plane of the rails, comprising a bar having means for supporting it by the rails remote from the meeting ends and in a plane parallel to the normal plane of the rails, said bar overlying the meeting ends of the rails, and duplicate means carried by the bar for respective cooperation with the rails at their meeting ends to simultaneously register any offset relation of each rail end in a direction perpendicular to the normal plane of the rails.

ALBERT E. HILL.